United States Patent
Carlsson

(10) Patent No.: US 6,868,282 B2
(45) Date of Patent: Mar. 15, 2005

(54) METHOD AND APPARATUS FOR ACCESSING A NETWORK USING REMOTE SUBSCRIBER IDENTITY INFORMATION

(75) Inventor: Hans Carlsson, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 256 days.

(21) Appl. No.: 10/106,568

(22) Filed: Mar. 26, 2002

(65) Prior Publication Data

US 2004/0204087 A1 Oct. 14, 2004

(51) Int. Cl.⁷ .................................................. H04M 1/00
(52) U.S. Cl. ....................... 455/558; 455/41.2; 455/411; 455/419; 455/435.1
(58) Field of Search ........................ 455/558, 41.2, 455/41.3, 410, 411, 57.1, 569.2, 419, 435.1, 2

(56) References Cited

U.S. PATENT DOCUMENTS

| | | | |
|---|---|---|---|
| 5,943,425 A | | 8/1999 | Mizikovsky |
| 5,987,325 A | * | 11/1999 | Tayloe ..................... 455/558 X |
| 6,466,804 B1 | * | 10/2002 | Pecen et al. ................. 455/558 |
| 6,615,057 B1 | * | 9/2003 | Pettersson ................... 455/558 |
| 2001/0005683 A1 | | 6/2001 | Zicker et al. |
| 2001/0021640 A1 | * | 9/2001 | Lappe ..................... 455/558 X |

FOREIGN PATENT DOCUMENTS

| | | |
|---|---|---|
| EP | 0891111 | 6/1998 |
| WO | WO 02/21867 | 3/2002 |

* cited by examiner

Primary Examiner—Nay Maung
Assistant Examiner—Philip J. Sobutka
(74) Attorney, Agent, or Firm—Moore & Van Allen PLLC; Steven B. Phillips

(57) ABSTRACT

Method and apparatus for accessing a network using remote subscriber identity information. Subscriber identity information in a memory store within a device such as a mobile terminal can be remotely used by a second independent device. In the case of a GSM terminal, for example, one terminal would be able to utilize the subscriber identity information contained in the subscriber identity module (SIM) of another terminal by establishing a local communication link between the two terminals. Remote subscriber identity information is transferred over the local communication link and the communication terminal, which is using the remote subscriber identity information can register with the network using that information, thus, eliminating the need to transfer the SIM.

8 Claims, 19 Drawing Sheets

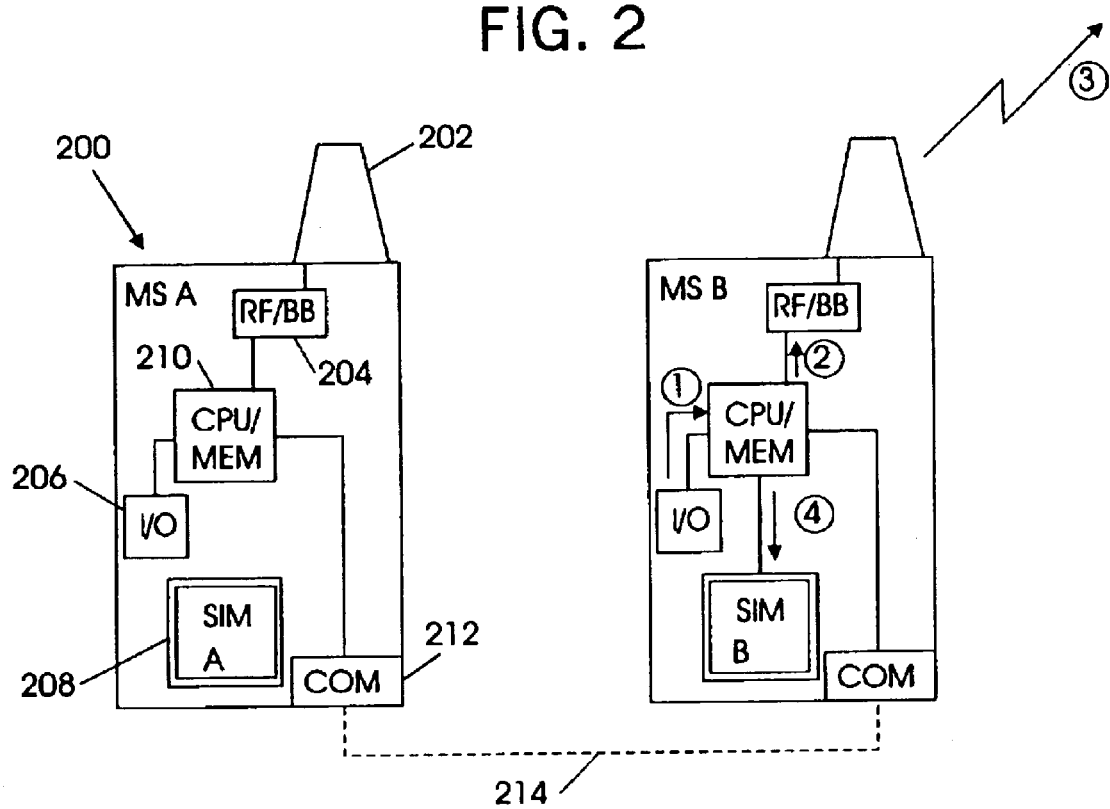
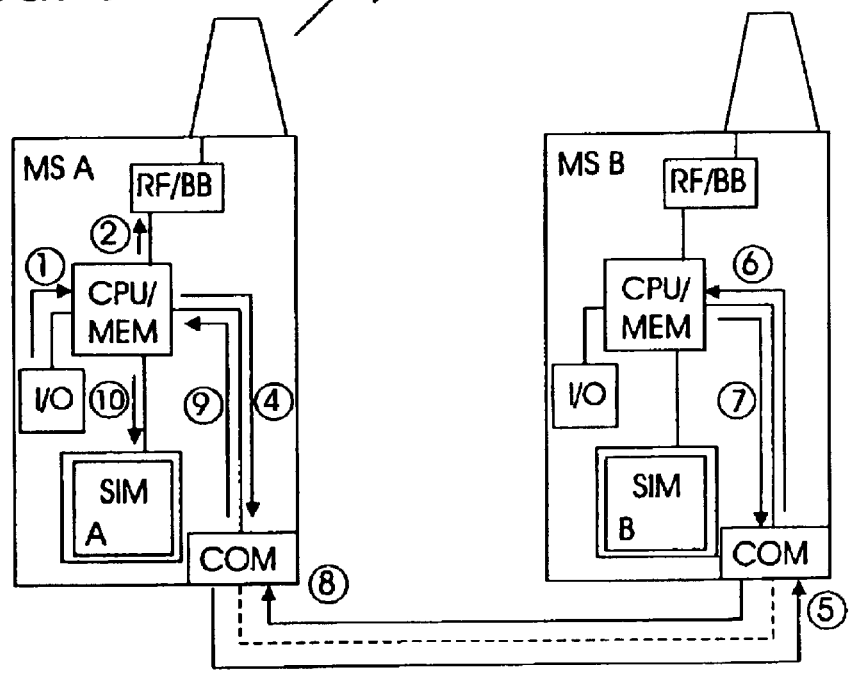

METHOD AND APPARATUS FOR ACCESSING A NETWORK USING REMOTE SUBSCRIBER IDENTITY INFORMATION

BACKGROUND OF THE INVENTION

With the wide proliferation of telecommunication access terminals, especially of the wireless type, the need for secure, trusted subscriber identity information to be provided in order to access a network has become firmly established. Based on current technology, subscriber identity information is often contained in a removable type of security element known as the subscriber identity module (SIM). A SIM is typically used in wireless telephones that operate according to the Global System for Mobile (GSM) standard. A similar form of removable store containing subscriber identity information is also used for in the relatively new, but already well-known, Universal Mobile Telecommunication System (UMTS). The later is often referred to as a universal SIM or USIM. For purposes of this disclosure, a removable store or security element which contains subscriber identity information will be referred to as a SIM.

In theory, moving the SIM between various devices allows a user to use one subscription with multiple devices. However, most often the SIM is a small integrated circuit card, which is not very simple to move from device to device. Often, the removal or insertion of a SIM card requires that the mobile phone or other device be disassembled some way, for example, by removing a battery. Many consumers are uncomfortable with disassembling their terminals. Additionally, there are occasions when a subscriber who already has a SIM installed may want to use a SIM from another terminal. In this case there is a risk that the subscriber's own SIM will be lost during the period that it is removed from the terminal to make room for the "borrowed" SIM.

BRIEF SUMMARY OF THE INVENTION

The present invention provides a way in which subscriber identity information in a memory store within a device such as a mobile terminal can be remotely used by a second independent device. In the case of a GSM terminal, for example, one terminal would be able to utilize the subscriber identity information contained in the SIM of another terminal by establishing a local communication link between the two terminals. The communication terminal, which is using the remote subscriber identity information from an independent device receives a command to use the remote subscriber identity information. This initial command can be entered by a user using the normal input/output (I/O) capabilities of the communication terminal, or it could be a command received over a communication link from the independent device which is going to supply the remote subscriber identity information. In any case, a local communication link is established between the two devices. Remote subscriber identity information is received over the local communication link and the communication terminal, which is using the remote subscriber identity information can register with the network using that information.

It should be noted that, prior to registering with the network using the remote subscriber identity information, the terminal which is accessing the remote information would have to de-register with the network, if it is already using the network with its own local subscriber information. In any case, the system can be set up so that a terminal that is using remote subscriber identity information to access the network requests and receives authentication information from the user through the I/O devices of the terminal. Additionally, the local communication link could provide a security layer implemented through any of various encryption technologies.

One or both of the independent devices or communication terminals which are involved in supplying and/or using remote subscriber identity information will often be wireless or mobile terminal, but either, or both, could be another type of device or communication terminal, for example, a personal computer. Once the supplying device receives a command to supply the information, either from a user via I/O or over a communication link, the appropriate local communication link is established between the first device and the second device. Subscriber identity information is then sent over the local communication link to the device or communication terminal that is to use the information remotely to access the network. Depending on how the system is designed, the terminal that is supplying the subscriber identity information may need address information for the terminal which is to remotely use the subscriber identity information. The user can supply this information through the normal I/O functions of the terminal. Again, subscriber identity information is stored within a memory store. This would often be a SIM of some sort, but might also be a fixed memory store within a device.

In at least some embodiments of the invention, a mobile terminal provides the means for using remote subscriber identity information, supplying remote subscriber identity information, or both. Such a mobile terminal, in some embodiments, includes a radio communication section, the local communication interface through which subscriber identity information is communicated, and a processor system, which controls the operation of the mobile terminal. The process or system typically includes a central processing unit (CPU) and memory in which is stored micro code to implement the various functions of the mobile terminal.

BRIEF DESCRIPTION OF THE DRAWINGS

FIG. 1 is presented as FIGS. 1A and 1B for convenience.

FIG. 2 is a functional block diagram of two mobile stations that are implementing the present invention. FIG. 2 also illustrates specific steps involved in using remote subscriber identity information according to the invention.

FIG. 3 illustrates steps involved in supplying remote subscriber identity information, according to some embodiments of the invention.

FIG. 6 is divided into FIGS. 6A–6K for convenience.

FIG. 7 is divided into FIGS. 7A–7J for convenience.

DETAILED DESCRIPTION OF THE INVENTION

The present invention is disclosed, by way of example, in the context of mobile terminals such as mobile phones, wireless phones, or wireless computing devices. At some places herein they might also be referred to as mobile stations. The invention is also disclosed by way of subscriber identity information contained within a memory store within a subscriber identity module (SIM). It should be noted that these embodiments are shown as examples only. For example, subscriber identity information, according to the invention, could be stored in a non-removable form such as random access memory (RAM) or other permanently wired semiconductor memory. Also, the devices involved that are either supplying subscriber identity information or using remote subscriber identity information do not have to be mobile stations. It is possible for one device or the other to be a fixed terminal such as a pay phone or personal computer.

In addition, the SIM card is evolving into various forms that enable e-commerce and wireless Internet access. The invention can be implemented with any of these forms of subscriber identity modules. A typical SIM card according to the GSM standard includes a semi-conductor chip carried by a mechanical support. The chip includes a small microprocessor connected via a small bus with memory and an I/O interface. The I/O interface includes conventional signaling circuitry coupled to a connector with a set of metal contacts. Subscriber identity information or identity data is organized in data files, which are read by the mobile terminal or other device that uses the SIM. The following standards relate to SIM cards as used in GSM. These standards are well known and are promulgated by the European Telecommunication Standards Institute (ETSI). The latest version of these standards as of the time of the filing of this application are incorporated herein by reference.

- GSM 11.11: "Digital cellular telecommunications system (Phase 2+); Specification of the Subscriber Identity Module—Mobile Equipment (SIM—ME) interface"
- GSM 11.12: "Digital cellular telecommunications system (Phase 2); Specification of the 3 Volt Subscriber Identity Module—Mobile Equipment (SIM—ME) interface".
- GSM 11.14: "Digital cellular telecommunications system (Phase 2+); Specification of the SIM Application Toolkit for the Subscriber Identity Module—Mobile Equipment (SIM—ME) interface".

In addition, the following standards pertain to the newer Universal Mobile Telecommunication System (UMTS), otherwise known as "3G." These standards are well-known and are promulgated by the International Telecommunications Union (ITU). The latest version of these standards as of the filing date of this application are incorporated herein by reference.

- 3GPP TS 31.101: "UICC-Terminal Interface, Physical and Logical Characteristics".
- 3GPP TS 31.102: "Characteristics of the USIM Application".
- 3GPP TS 31.111: "USIM Application Toolkit (USAT)".

Figure 1A:
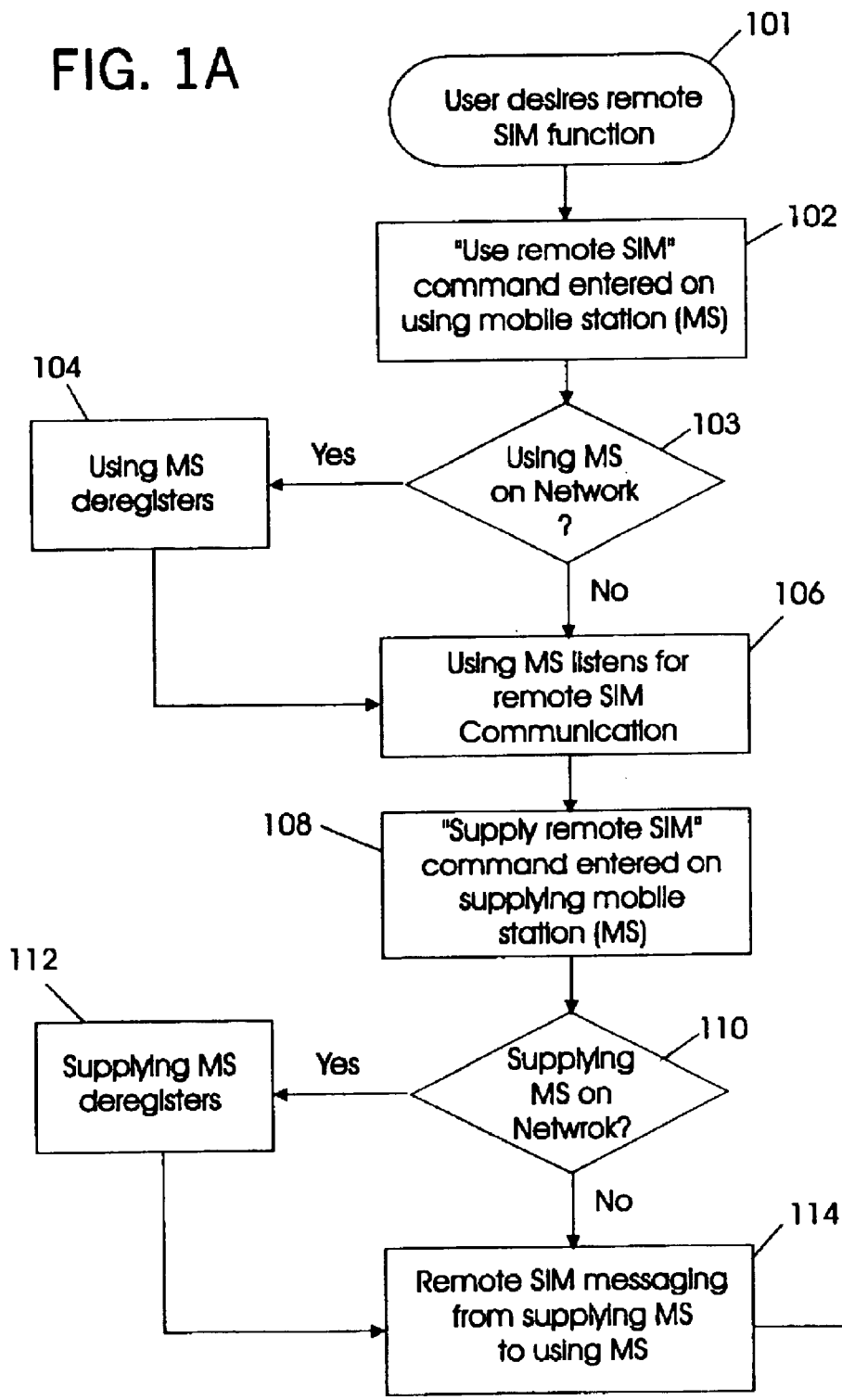
FIG. 1 is a flow chart illustrating the overall method according to at least some embodiments of the invention.
Figure 1B:
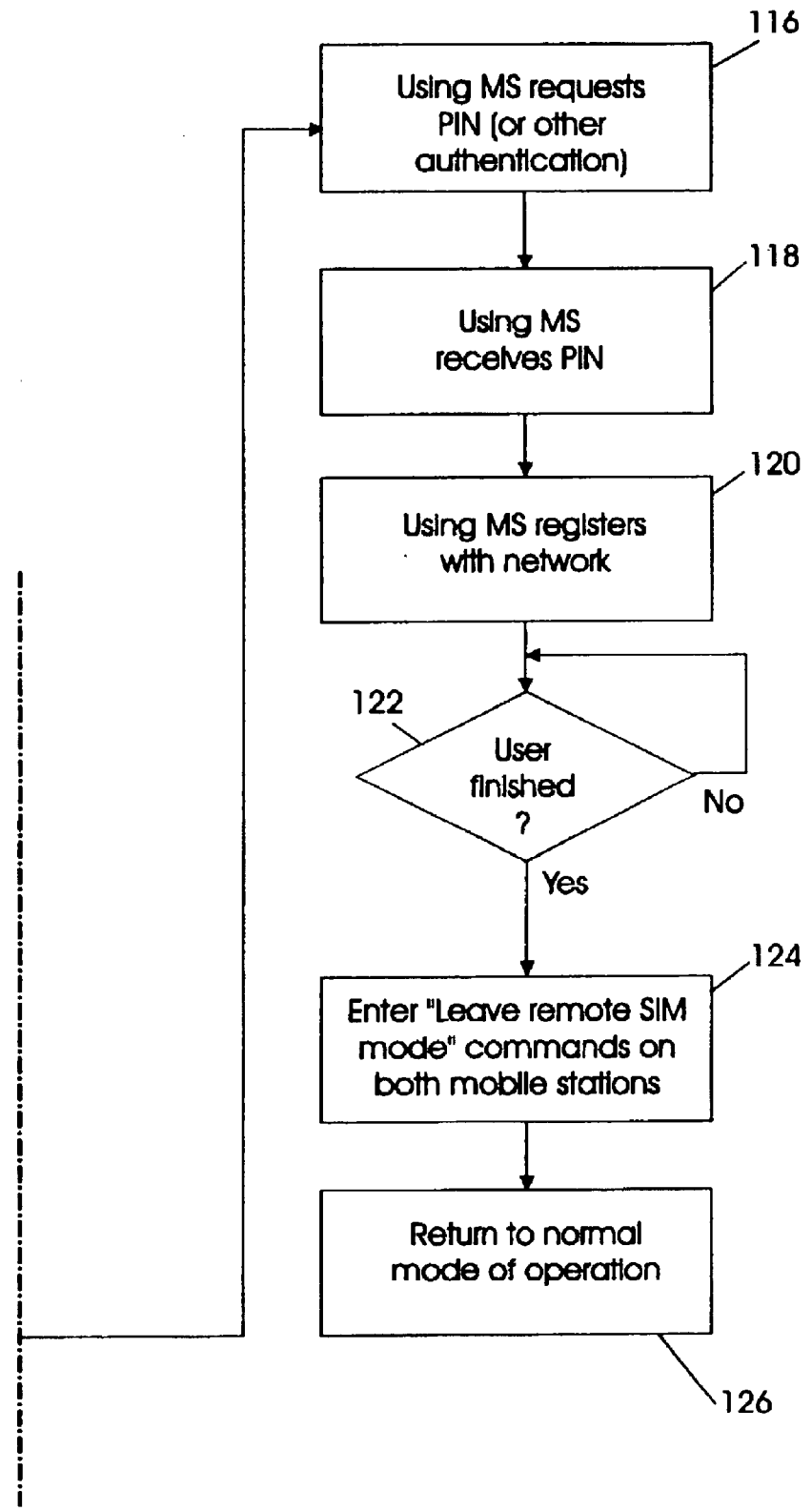

FIG. 1 illustrates the overall method of the invention according to an example embodiment. FIG. 1 is presented as FIGS. 1A and 1B for convenience. At step 101, a user decides to use the remote SIM function according to the invention. The user enters a command through the I/O interface of the mobile station or other terminal at step 102.

At step 103 a check is made to determine if the using mobile station is registered with the network. If so, it de-registers at step 104. In either case, the mobile station is now put in a mode to listen for remote SIM communications on a local communication interface at step 106. It is important to note that it may be necessary for the mobile station that is to use the remote subscriber identity information to de-register with the network. This might be the case for example, if this mobile station contained its own SIM with its own local subscriber identity information. Essentially, the unit would switch over from using its own local subscriber identity to using remote subscriber identity information received from another device over a local communication link.

At step 108, the other mobile station or terminal, which is to supply the remote subscriber identity information, receives a command to supply the information at step 108. This command could be received from a user via the I/O of the supplying device. Alternatively, the supplying mobile station could receive some type of command from the using station, specifically requesting the use of the remote subscriber identity information. For purposes of the rest of this disclosure, it will be assumed that the subscriber has entered a command on the terminal that is to supply the remote subscriber identity information. At step 110 a check is made to determine if the supplying mobile station is registered with the network. If so, it will be necessary for the supplying mobile station to de-register at step 112. This de-registration is necessary because the network prohibits two stations with the same subscriber identity to be registered on the network at the same time. Currently, wireless systems are set up with this prohibition to prevent unlawful or illegitimate use of subscriber accounts.

At step 114 the local communication link to provide remote SIM functions is set up and appropriate messaging begins so that remote subscriber identity information can be sent from the supplying mobile station's SIM to the using mobile station. It is of some importance that the usage of this convenience be made secure so that nobody can make unauthorized use of a subscriber's subscription information. One security measure that can be implemented is the requesting of a personal identification number (PIN) or other user authentication information at the terminal which is using the remote SIM function. This PIN can be the normal PIN that is commonly stored in the SIM, or a special PIN established for the remote function. This request is made through the using mobile station's I/O at step 116. At step 118 the user inputs the PIN. At step 120 the using mobile station registers with the network using the remote subscriber identity information from the SIM in the supplying mobile station.

At step 122 the user has decided that he or she is finished with the communication. At step 124 the user enters a command to cease the remote SIM operation. This may involve entering a command on each mobile station that in effect says "leave remote SIM mode" or it may involve entering such a command on only one station. In the later case, the station that receives the command would communicate it to the other station. At step 126 both mobile stations resume their normal mode of operation.

FIGS. 2–5 each illustrate a different, specific sequence of commands that take place on the terminals involved in order to implement some embodiments of the present invention. The Figures also illustrate block diagrams of one type of communication terminal that can implement the invention, namely a mobile or wireless phone. In these Figures, the mobile terminal which is designated mobile station A or "MS A" is supplying remote user identity information from a SIM. Mobile station B designated "MS B" is using remote subscriber identity information. MS B may or may not contain a SIM. For purposes of illustration, it is shown as containing a SIM. Steps are given sequence numbers, which appear in circles in the drawings. The various components inside a mobile station are illustrated with reference numerals on MS A in FIG. 2. It can be assumed for purposes of illustration that the mobile stations are identical to the one shown as MS A in FIG. 2. Therefore, the reference numerals will not be repeated so as not to obscure other details of the subsequent drawings.

Turning to the specifics of FIG. 2, MS A, 200, includes an antenna, 202, and a radio communication section, 204. The radio communication section includes what is typically known as the radio frequency (RF) block, and the base-band (BB) logic. Within the RF block, receive and transmit information is converted from and to radio frequencies of the various carrier types. Filtering is also supplied as understood in the art. The base-band logic performs basic signal processing including synchronization, channel coding, decoding, and burst formatting as understood in the art. Input/output (I/O) section 206 encompasses the audio interface, control logic, and the keypad and liquid crystal display (LCD) or other display type. Mobile terminal 200 also includes SIM A, 208. The SIM MS B is labeled SIM B. These SIM's include a memory store containing subscriber identity information as previously described.

Processor system 210 includes a central processing unit (CPU) and memory. This processor system executes some form of software, typically known as microcode, which controls the operation of the phone to implement all of its functions, including the functions of the invention. It should be noted that in this example embodiment, the memory store, which includes subscriber identity information, is within SIM 208. Memory within the processor system, 210, stores other information and code necessary to operate the phone. It cannot be over-emphasized that this is an example only. For example, the memory within the processor system, 210, could also be used as the memory store for the subscriber identity information.

Communication interface 212 is a local communication interface, not to be confused with the communication interface implemented by the radio communication section and antenna, 204 and 202, respectively. The local communication interface is used to establish a local communication link between the two mobile stations involved in implementing this embodiment of the invention. This link can use any of a variety of communication methods, including infrared, wireless local area network (WLAN), or even a physical cable such as might be the case with a serial interface. The local communication interface could also use short-range wireless technology such as the well-known "blue tooth" technology. The specific choice of the communication protocol is not important to the invention and will not be discussed further. In any case, two mobile terminals can establish a local communication link, 214, in order to carry out the invention.

We now turn to the signaling that takes place within and between implementing the invention, as illustrated in FIGS. 2 through 5. FIG. 2, in addition to illustrating the components of a mobile terminal, also illustrates what happens when a command to use a remote SIM is entered at MS B. Initially, the I/O unit of MS B receives the operation command from the user and sends the request on to the CPU within the processor system at step 1. If MS B is already registered with the network, the CPU sends a request to the radio communication section to transmit a request to de-register from the network at step 2. In GSM, the request would be a "DETACH INDICATION" message. If MS B were engaged in data communication using the General Packet Radio Service (GPRS) portion of GSM, the message would be a "DETACH REQUEST" message. At step 3, the RF block transmits the de-registration message to the network. If there is a SIM present in MS B, as illustrated in the drawing, the CPU then deactivates this local SIM. It should be noted that MS B may not have a SIM. In this case, the de-registration and deactivation steps would be omitted. Once this process is complete, MS B is now "listening" for communication over its local communication interface.

FIG. 3 illustrates the process when MS A is given a command to supply remote subscriber identity information, or remote SIM function, to MS B. MS A first receives a command to enter the "supply remote SIM" mode of operation. In this example, this command is received from a user through the I/O section. If the protocol used to establish the local communication link requires an address for terminal to terminal communication, the address of MS B is also entered into the I/O section and sent to the CPU. The command and address are sent to the CPU at step 1. If MS A is already registered with the network, the CPU sends a request to the radio communication section to transmit a request to de-register from the network at step 2. The RF block within the radio communication section transmits the de-registration message at step 3. At step 4, the CPU within the processor system requests that the local communication interface set up a secure communication link with MS B. In this example, MS A sends to MS B a "supply remote SIM mode started" message so that MS B can establish a remote SIM operation.

At step 5 a terminal to terminal communications link is established using the appropriate protocol. If a wireless protocol is used that does not provide for encryption, the units will establish an encryption protocol layer on top of the used protocol. At step 6 this message is forwarded to the CPU and MS B. At step 7, if the CPU and MS B accepts the remote SIM operation, it sends and acknowledgement with a request to MS A to activate SIM A for its use. If it did not accept the request, it would send an appropriate message. The request might not be accepted, for example, because of an error condition or because MS B has not been put into a "use remote SIM" operation mode. At step 8 the message is forwarded back to MS A. At step 9 the message is forwarded to the CPU. The CPU sends an activation request to SIM A at step 10, activating it for remote use by MS B. Communication now takes place between MS A and MS B as if the CPU in MS B and the SIM in MS A are in one physical device. Subscriber identity information needed to register with the network is sent from MS A to MS B. If a PIN is used for SIM A, part of the activation procedure will be that the PIN code must be entered on MS B in order for the activation to be completed. When MS B registers with the network, further communications with SIM A are triggered, all according to existing known standards. The path for this communication from MS B is processor system in MS B, local communication interface in MS B, local communication interface in MS A, processor system in MS A, and SIM A.

Figure 4:
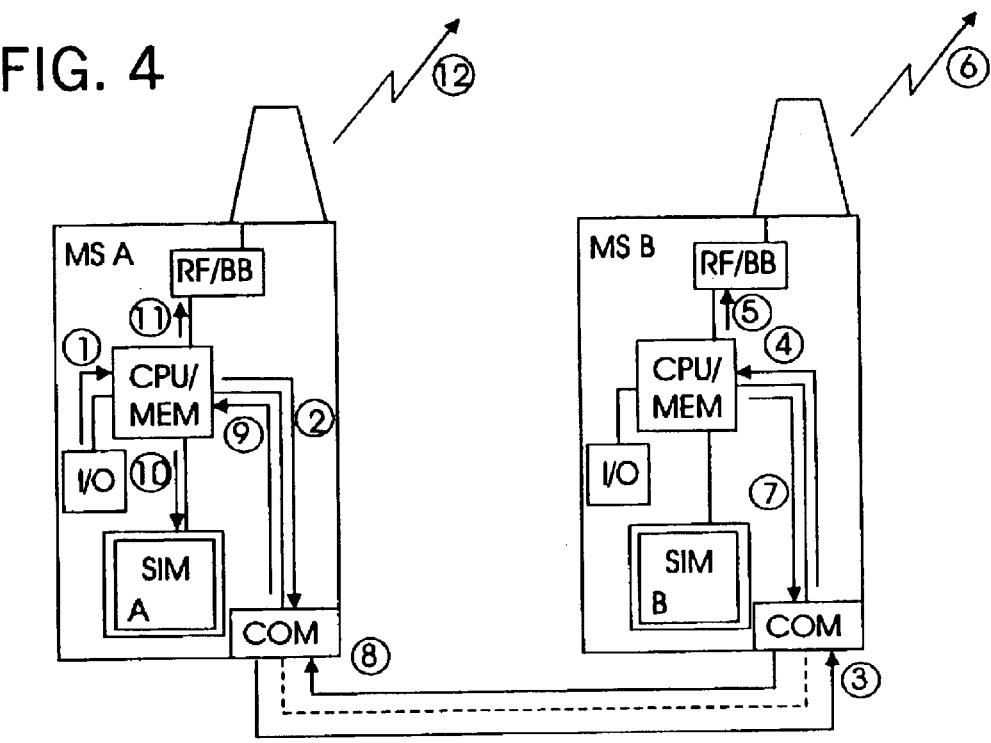
FIG. 4 illustrates how a mobile station or mobile terminal stops supplying remote subscriber identity information according to some embodiments of the invention.

FIG. 4 illustrates the process when MSA is given a command to stop supplying remote subscriber identity information or to leave the "supply remote SIM" mode. Initially, the I/O unit receives the "leave supply remote SIM" command and sends the request on to the CPU at step 1. Alternatively, this command can come over the local communication interface from MS B. Assuming that the later is not the case, the CPU in MS A will send a message that the remote SIM mode has ended. The message will be sent through the local communication link at step 2. At step 3 the message is forwarded to MS B. At step 4 the message is forwarded from the local communication interface at MS B to the CPU in the processor system of MS B. At step 5, the CPU in MS B notifies the radio communication section to deregister with the network. The RF block transmits the de-registration message to the network at step 6. At step 7, the CPU in MS B sends a confirmation message to the local communication interface which is forwarded to MS A at step 8. At step 9 this message is sent from the local communication interface to the processor system of MS A. At step 10 the SIM is deactivated for use by MS B and reactivated for use by MS A. The CPU will go through the normal registration procedures, transmitting information to the radio communication section at step 11 so that MS A then re-registers with the network at step 12. Note that if MS A had received a message first, that it was leaving the "use remote SIM" mode, as described in FIG. 5, MS A would have simply deactivated its SIM for use by MS B and proceeded from step 10.

Figure 5:
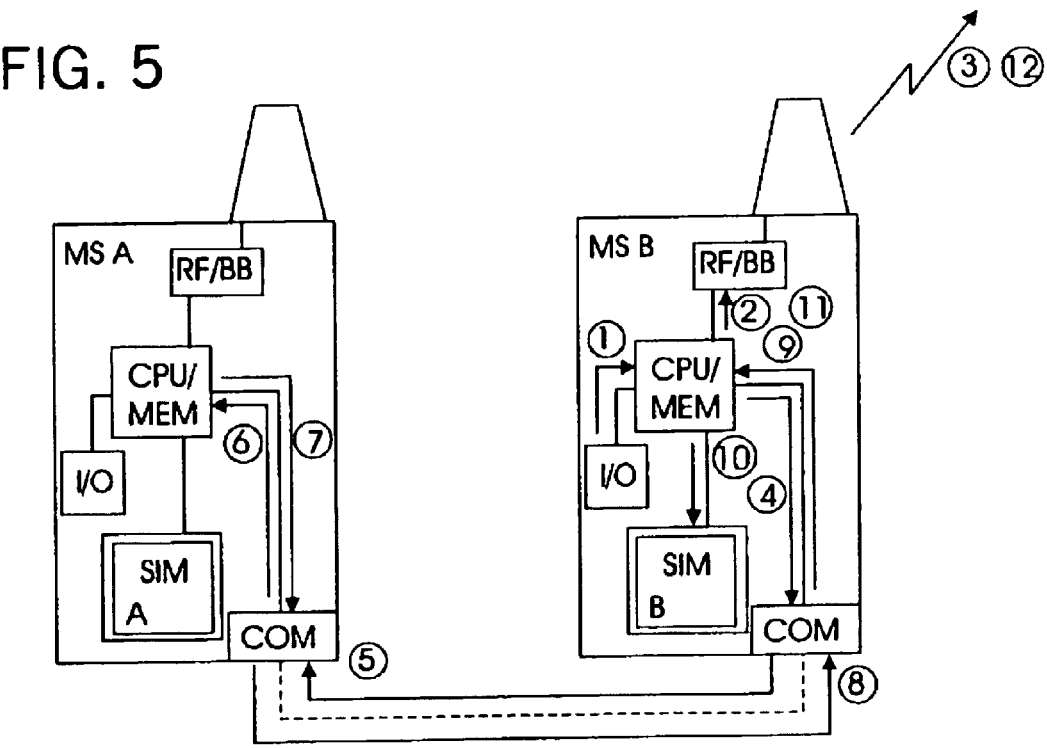
FIG. 5 illustrates the steps involved in ceasing the use of remote subscriber identity information according to some embodiments of the invention.

FIG. 5 illustrates the process when MS B, the using terminal, is given the command to "leave use remote SIM mode." The I/O unit receives the command through the I/O section and forwards that command to the processor system at step 1. The CPU in the processor system immediately directs the radio communication section to de-register with the network at step 2. The appropriate de-registration message is transmitted to the network at step 3. Note, it is possible that MS B has already de-registered. Assuming that MS B has not received any messages from MS A that the remote subscriber identity information is to stop being supplied, the CPU and MS B will send a message to the local communication interface at step 4 to be forwarded to MS A. The message tells MS A that MS B no longer needs remote subscriber identity information. The message is forwarded to MS A at step 5. It is then forwarded from the local communication interface in MS A to the processor system at step 6. A response message is forwarded from the CPU in MS A to the local communication interface at step 7. The message is then forwarded on to MS B at step 8. The message is then forwarded from the local communication interface in MS B to the CPU in MS B at step 9. This message confirms that the remote SIM operation is being ended.

The process above ends if MS B does not contain its own subscriber identity information in either SIM B, or another memory store. If MS B does contain its own local subscriber identity information, the CPU in MS B activates the SIM or memory store at step 10. If this SIM uses a PIN, activation procedures will proceed in the normal fashion, that is, requiring PIN code entry. At this point, the CPU within the processor system of MS B notifies the radio communication section at step 11 that MSB is to reregister with the network using local subscriber identity information. The RF block within the radio communication section of MSB registers with the network at step 12.

FIG. 6 presents a series of drawings, which illustrate the operation of a state machine that may be programmed into a supplying terminal to implement the method of the present invention. FIG. 6 is divided into views, which are presented as FIGS. 6A through 6J. Each view represents the transition between two or three specific states or modes of operation by the supplying terminal with respect to remote subscriber identity information. Again, as before, it is assumed that the devices involved are mobile terminals or mobile stations and that at least one of them is equipped with a SIM card which provides the subscriber identity information. The state transition diagrams use notation that is familiar to those of ordinary skill in the art.

Figure 6A:
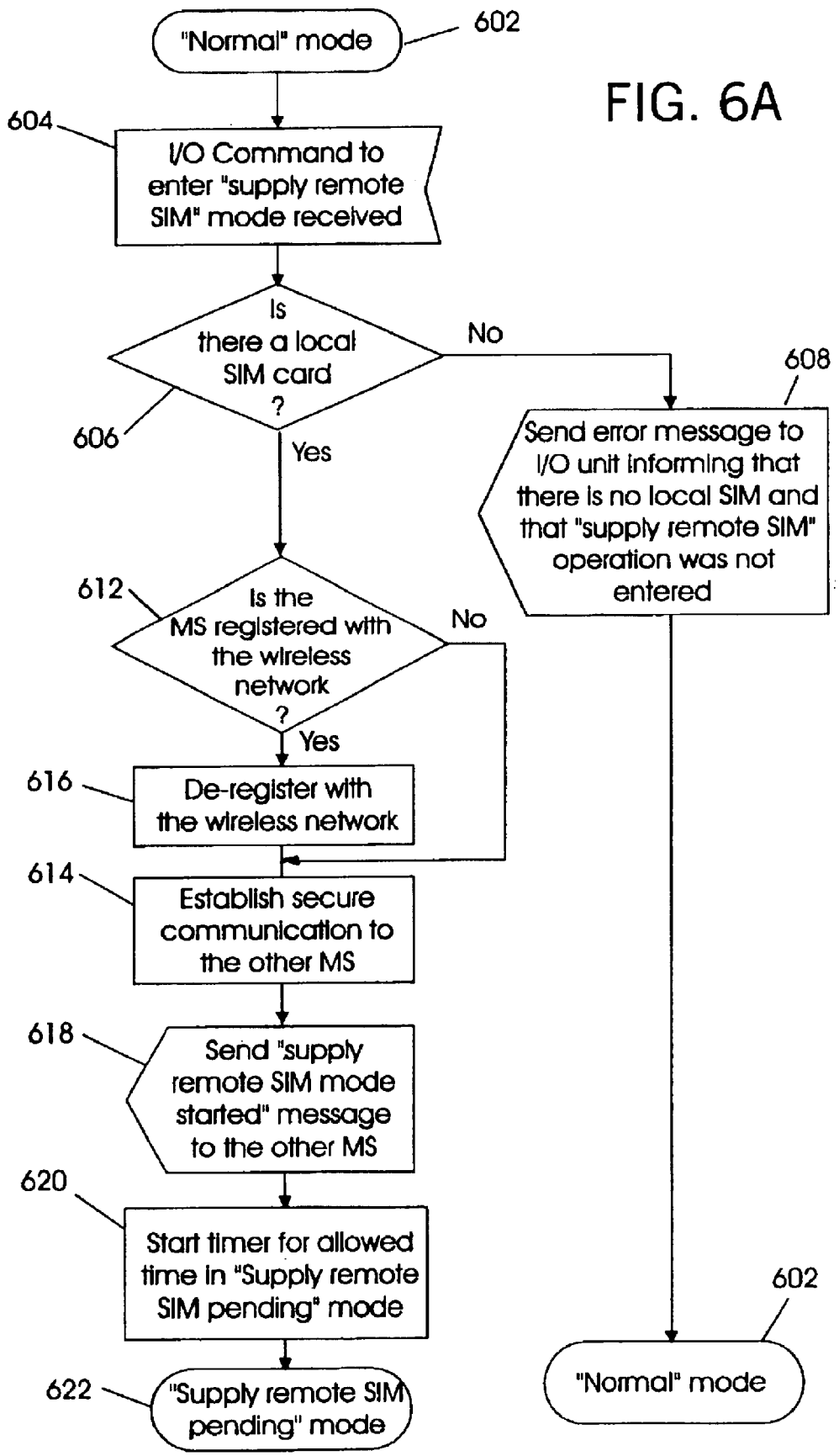
FIG. 6 illustrates the operation of a state machine operating in a terminal which is supplying remote subscriber identity information which can be used to implement the present invention in some embodiments.

FIG. 6A illustrates the operation of the state machine in a supplying device starting in normal mode at 602. The I/O command to enter the "supply remote SIM" mode is received by the processor at 604. At 606 the state machine checks to determine if there is a local SIM card available. If not, an error message is generated at 608 and normal mode resumes at 602. If so, a check is made at 612 to see if the supplying mobile station is registered with the network. If not, a secure local communications link to the other mobile station is established at 614. If so, the supplying mobile station must de-register with the network at 616. At 618, the supplying mobile station sends a "supply remote SIM mode started" message to the other mobile station, that is, the mobile station that is to make use of the remote subscriber identity information. The state machine then implements a timer to restrict the amount of time that the "supply remote SIM" mode can be pending. This timer is started at 620. The state machine has now entered the "supply remote SIM pending" mode 622.

Figure 6B:
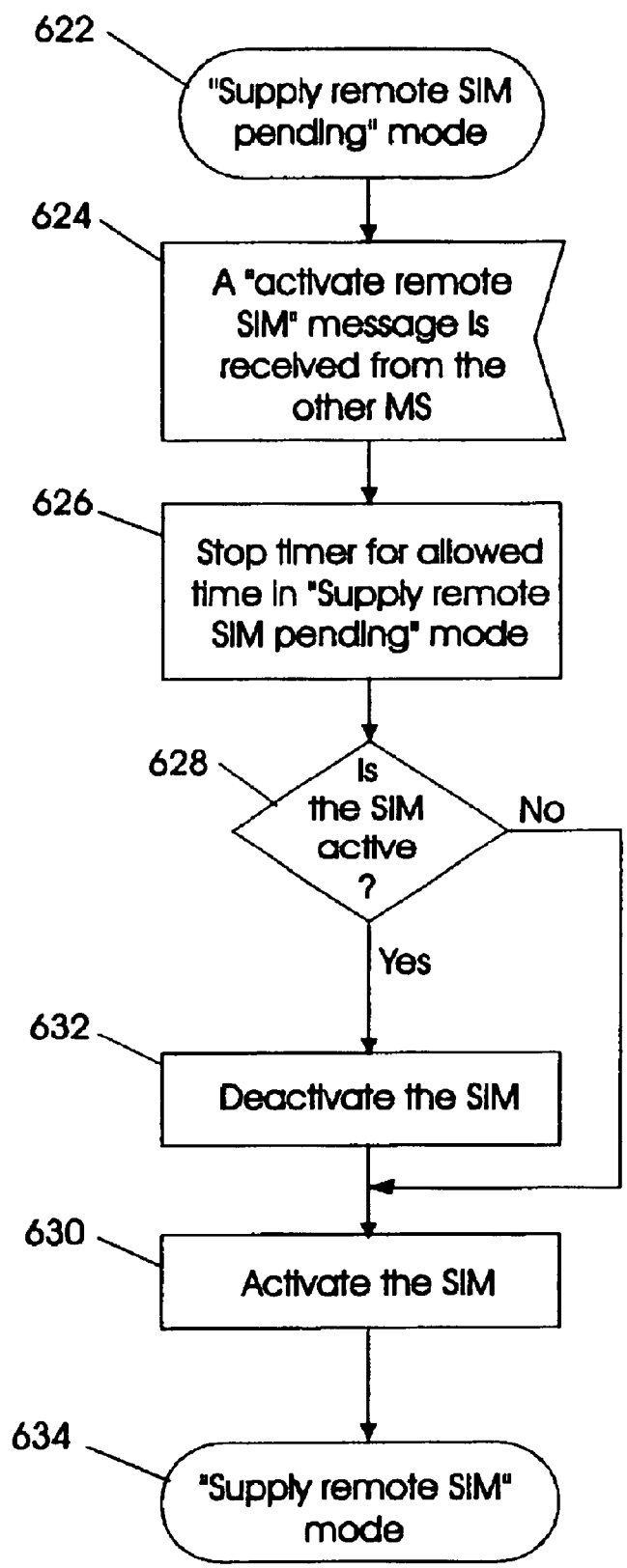

Turning to FIG. 6B, the supplying mobile station is in the "supply remote SIM pending" mode 622 as before. At 624, it receives a confirmation message from the using mobile station. At step 626, the pending timer is stopped. At step 628, a check is made to see if the SIM in the supplying terminal is active. If not, it is activated at step 630 to supply subscriber identity information to the other terminal. If so, it is deactivated at step 632 and then activated again. The supplying unit is now in the "supply remote SIM" mode 634.

Figure 6C:
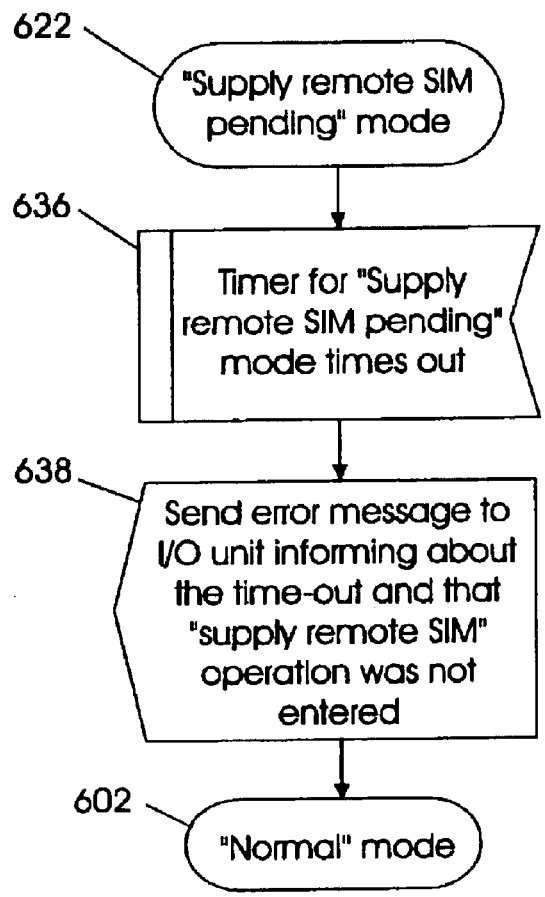

FIG. 6C illustrates what happens if the pending timer times out. The supplying mobile station is in the pending mode 622 as before. At 636, the timer times out. At 638, an error message is generated within the CPU and sent to the I/O section of the mobile station terminal informing a user about the time out. The unit then returns to normal mode 602.

Figure 6D:
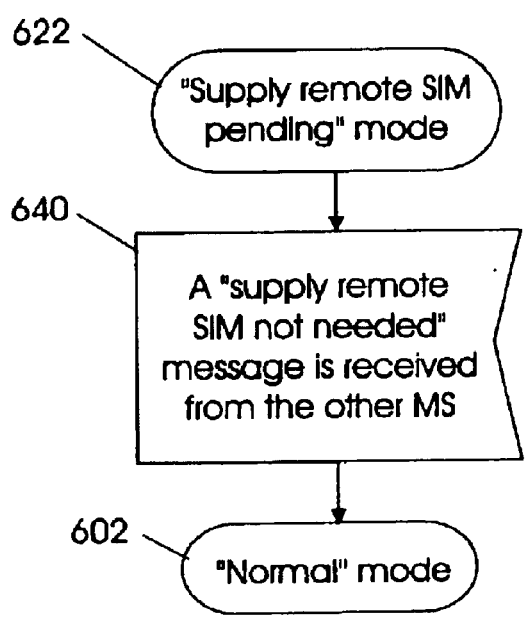

FIG. 6D shows what happens if the using mobile station terminal notifies the supplying terminal that it does not need to use remote SIM capability. Again, the supplying terminal is in pending mode 622. At 640 the message is received from the other terminal. The supplying terminal then returns to normal mode 602 as before.

Figure 6E:
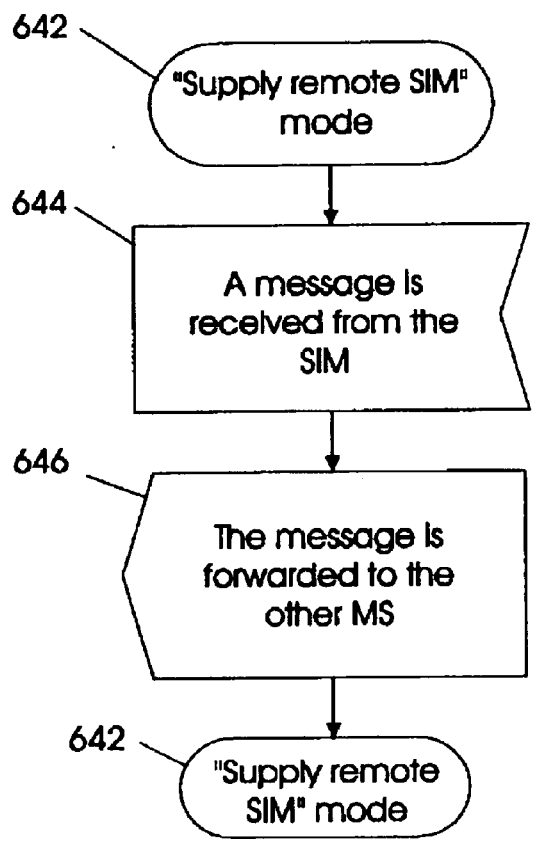
Figure 6F:
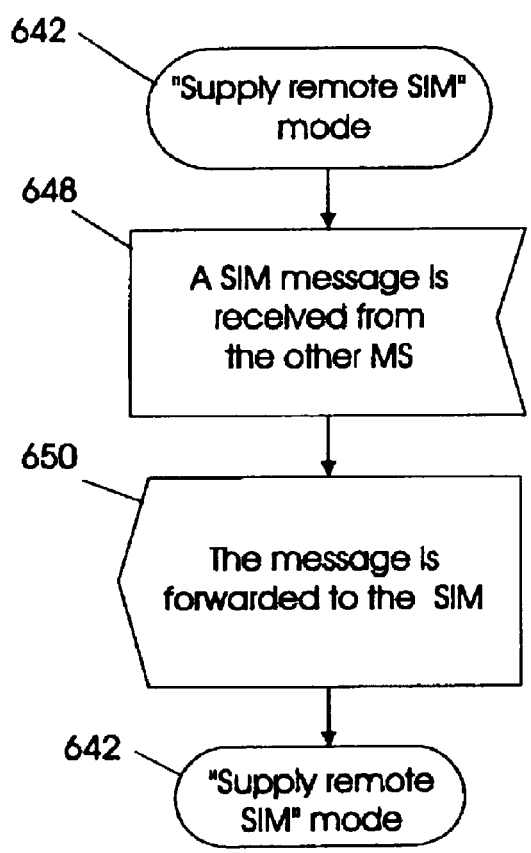

FIGS. 6E and 6F both illustrate operations within the "supply remote SIM" mode, 642. In FIG. 6E, a message is received from the SIM and is then forwarded to the other terminal at 646. In FIG. 6F, a SIM message is received from the other terminal at 648 and then forwarded to the SIM within the supplying mobile station at 650.

Figure 6G:
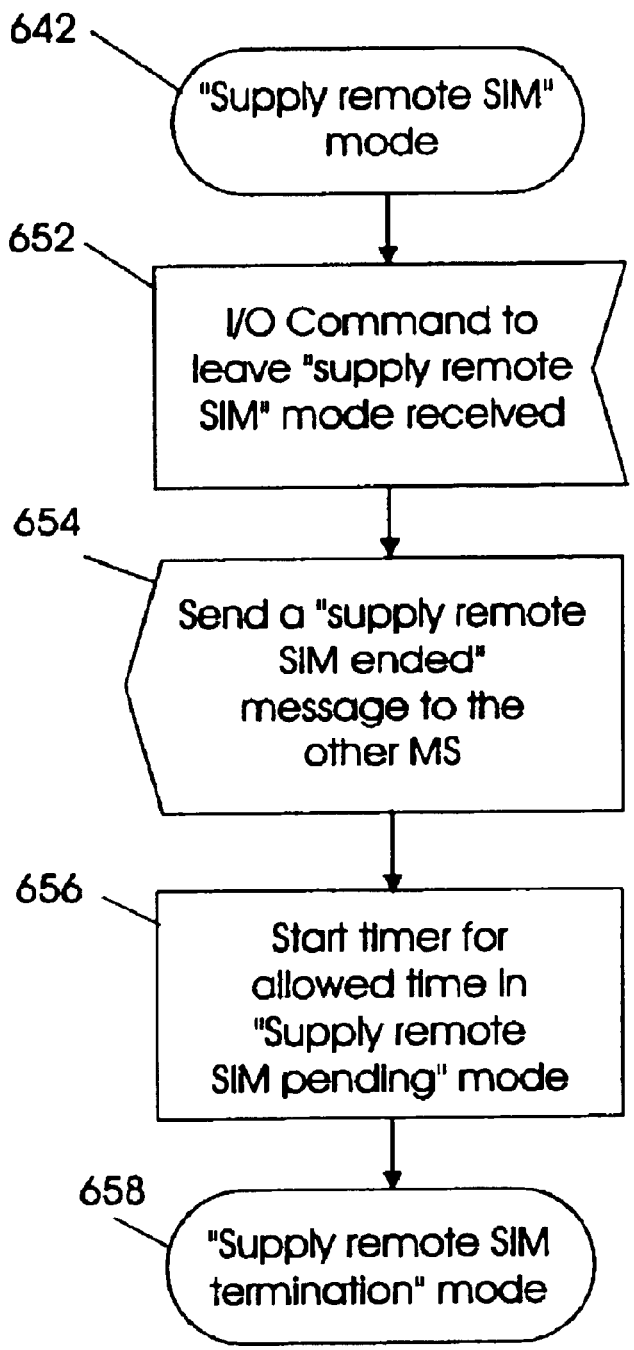

FIG. 6G illustrates how the state machine transitions from the "supply remote SIM" mode to the "supply remote SIM termination" mode. The state machine starts out in "supply" mode 624. At 652, an I/O command is received from the I/O section to terminate the supplying of remote subscriber identity information. At 654 the state machine causes the CPU to send a message to the other terminal that the supplying mobile station will no longer supply the remote SIM information. At 656 a pending timer is started again, to limit the amount of time that the "supply remote SIM end" command can be pending. The supplying unit is now in the "supply remote SIM termination" mode, 658.

Figure 6H:
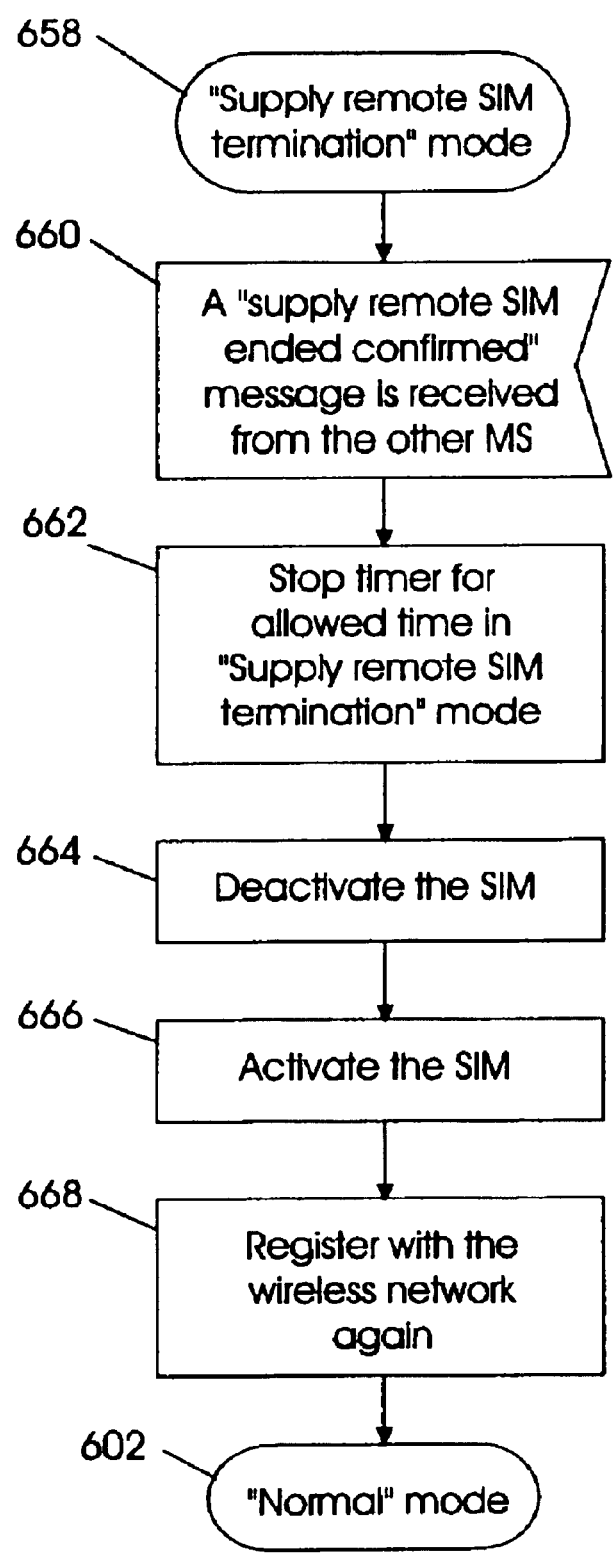
Figure 61:
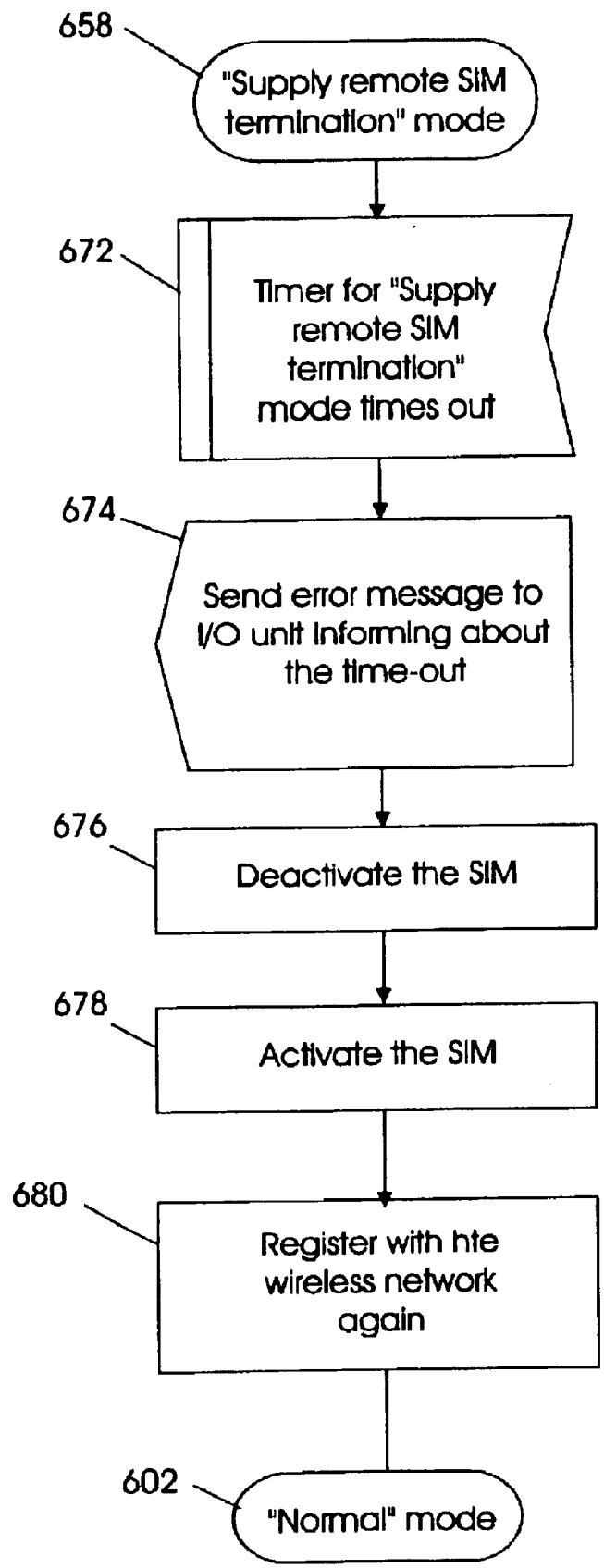

In FIG. 6H, the state machine transitions from "supply remote SIM termination" mode 658 back to normal mode 602. At step 660, a "supply remote SIM ended confirm" message is received from the other terminal. The pending timer is stopped at step 662. The SIM is deactivated for supplying remote SIM information at 664. The SIM is then reactivated to begin servicing the local mobile station at 666. At 668, the state machine causes the supplying terminal to re-register with the network.

FIG. 6I shows what happens if the pending timer for the above operation times out. In FIG. 6I, the supplying mobile station or terminal is transitioning from "supply remote SIM termination" mode 658 to normal mode 602. At 672 the timer times out. At 674 an error message is sent to the local I/O section to inform the user of the time-out condition. At 676 the SIM is again deactivated from supplying remote subscriber identity information. At 678 the SIM is again activated for local use, and at 680 the supplying terminal re-registers with the network using the SIM.

Figure 6J:
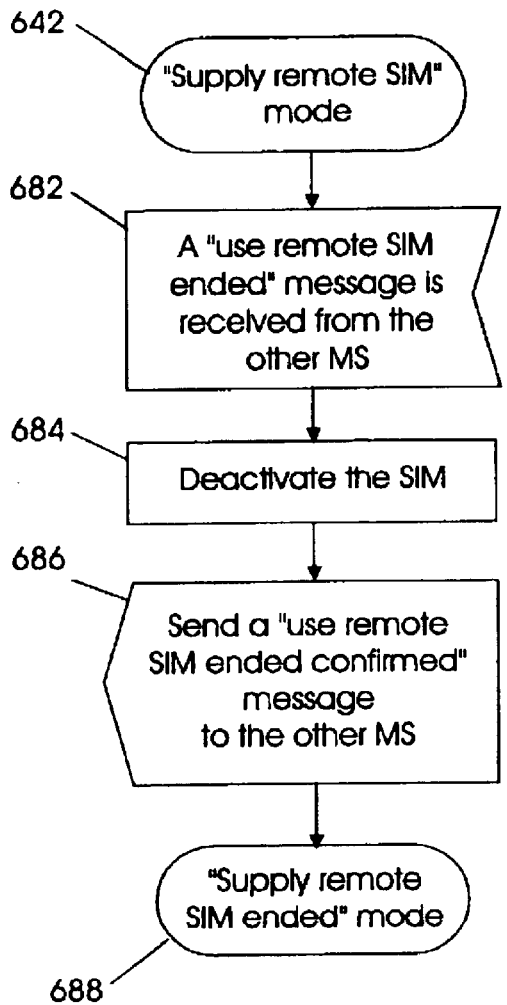

In FIG. 6J, the supplying terminal is again in the "supply remote SIM" mode 642. In this case, a "user remote SIM ended" message is received from the using mobile station at 682. The SIM within the supplying terminal is deactivated at 684. A confirmation message is sent to the other terminal at 686. The supplying terminal is now in "supply remote SIM ended" mode 688.

Figure 6K:
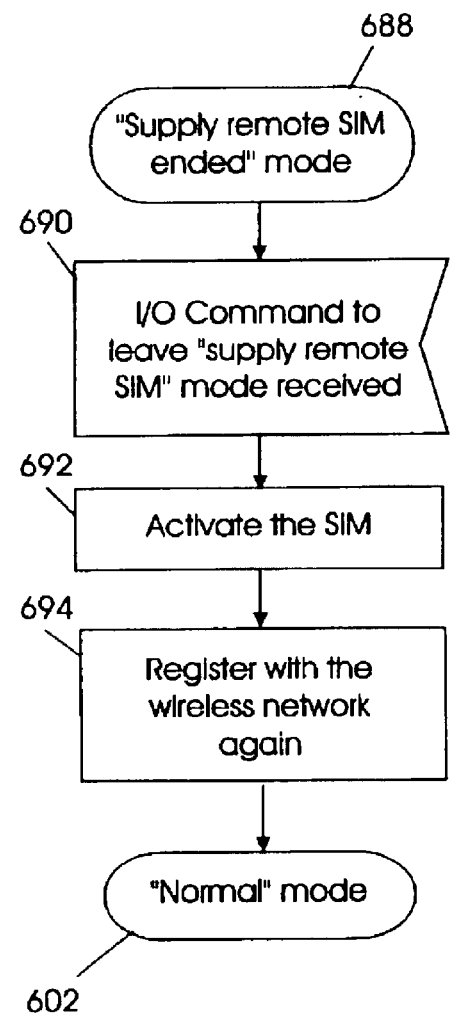

In FIG. 6K, from the "supply remote SIM ended" mode 688, a command from the user input at the I/O section at 690 confirms that the user desires to end the operation. The SIM in the supplying terminal is again activated at 692, and the unit reregisters with the network at 694. Normal operation, 602, is resumed.

Figure 7A:
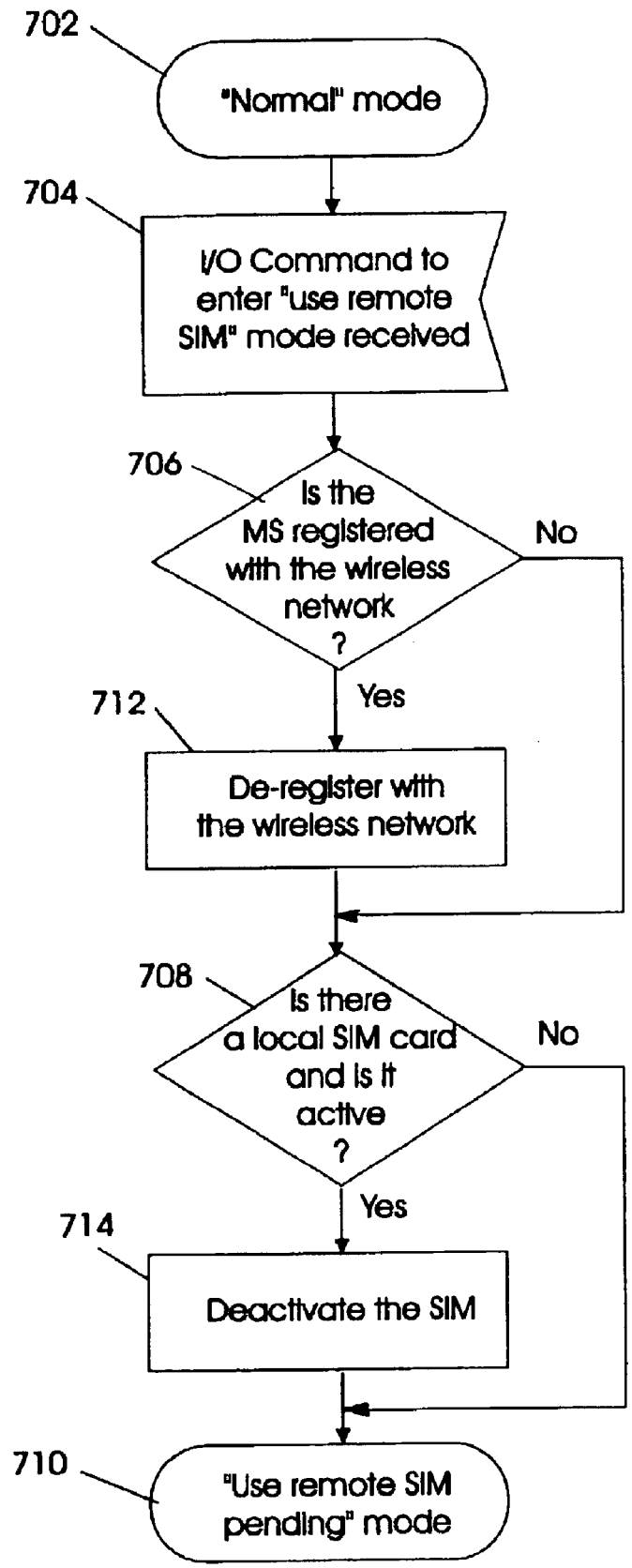
FIG. 7 illustrates the operation of a state machine operating in a terminal which is using remote subscriber identity information which can be used to implement the present invention in some embodiments.

The remaining state machine diagrams illustrate state machine operation for the using mobile station or terminal, that is, the terminal that is accessing remote subscriber identity information from a memory store, for example, a remote SIM. FIG. 7A begins with the using terminal in normal mode 702. At 704, an I/O command is received from the user through the I/O section of the terminal to use a remote SIM. At 706, a check is made to see whether or not the using mobile station is registered with the network. If not, a check is made at 708 to see if there is an active local SIM card. If not, the mobile station goes into "use remote SIM pending" mode 710. If it had been registered with the network, it would have de-registered at 712. Also, if there had been a local SIM, it would have been deactivated at 714.

Figure 7B:
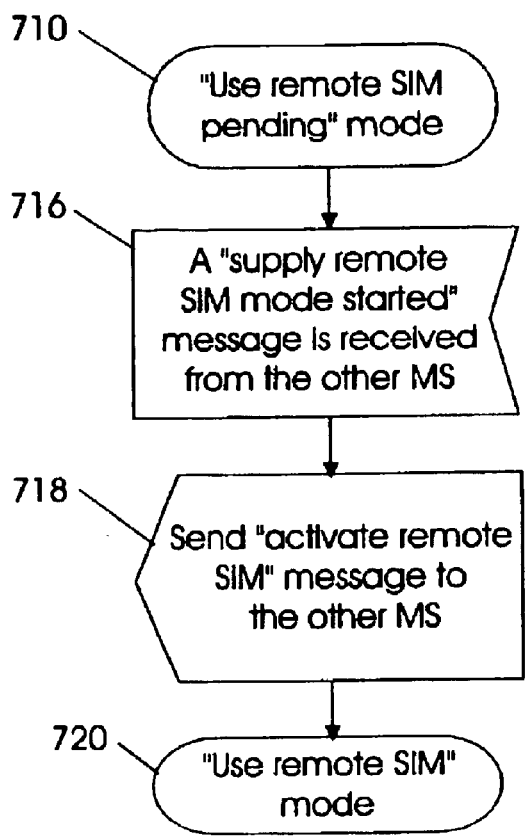

The state transition diagram of FIG. 7B begins at the "use remote SIM pending" mode, 710. A "supply remote SIM started" message is received from the other, supplying mobile station at 716. At 718 the using mobile station replies with an "activate remote SIM" message. This message results in the using terminal entering the "use remote SIM" mode, 720.

Figure 7C:
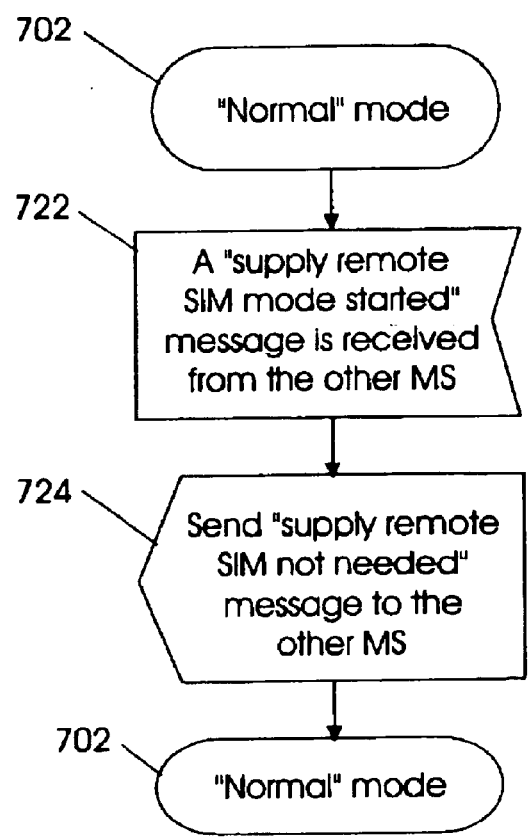

FIG. 7C illustrates what happens during normal mode 702 when the using station has not been put in the "use remote SIM" mode. If a "supply remote SIM mode started" message is received from the other terminal at 722, a "not needed" message is returned at 724.

Figure 7D:
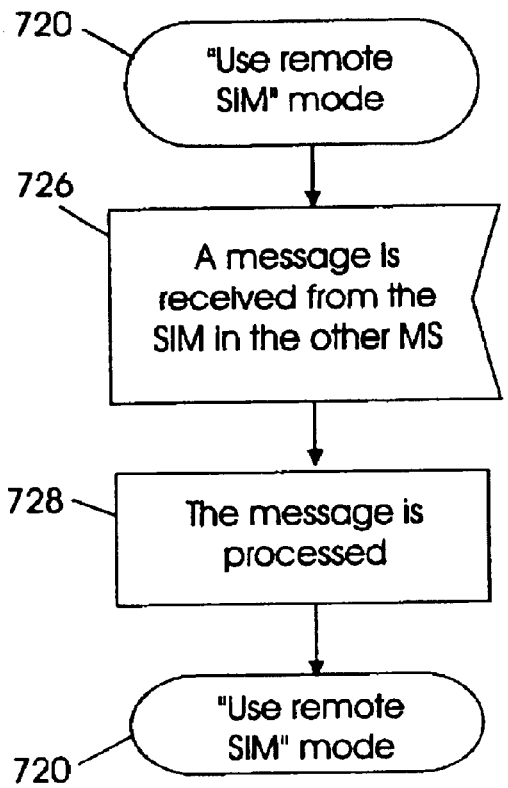
Figure 7E:
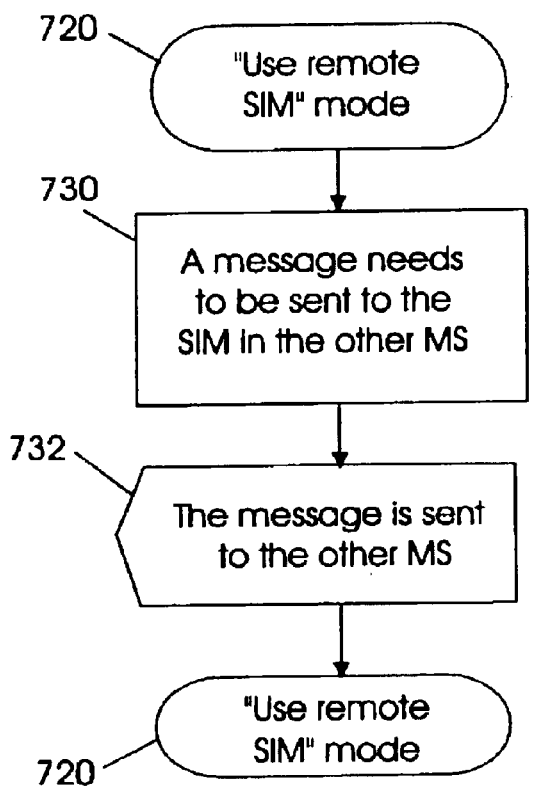

FIGS. 7D and 7E illustrate the operation in the "use remote SIM" mode, 720. In FIG. 7D, a message is received from the SIM in the supplying terminal at 726 and the message is processed at 728. This message may include the subscriber identity information from the store within the remote SIM. In FIG. 7E, when a determination is made that a message needs to be sent to the remote SIM at 730, that message is sent at 732.

Figure 7F:
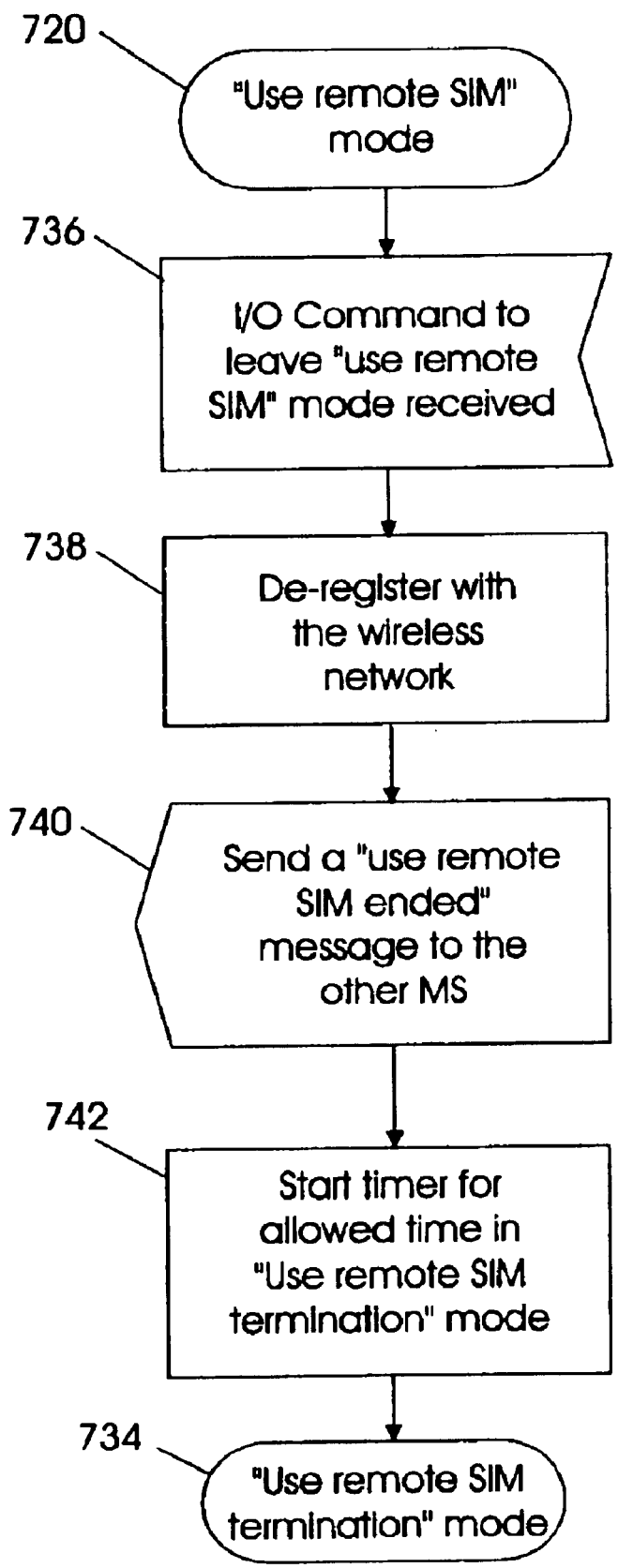

FIG. 7F illustrates how the state machine in the using terminal transitions from the "use remote SIM" mode, 720, to the "use remote SIM termination" mode, 734. An I/O command to leave the "use remote SIM" mode is received from the user at 736. The terminal de-registers with the wireless network at 738. It sends a "use remote SIM ended" message to the other mobile station at 740. A pending timer is then started at 742.

Figure 7G:
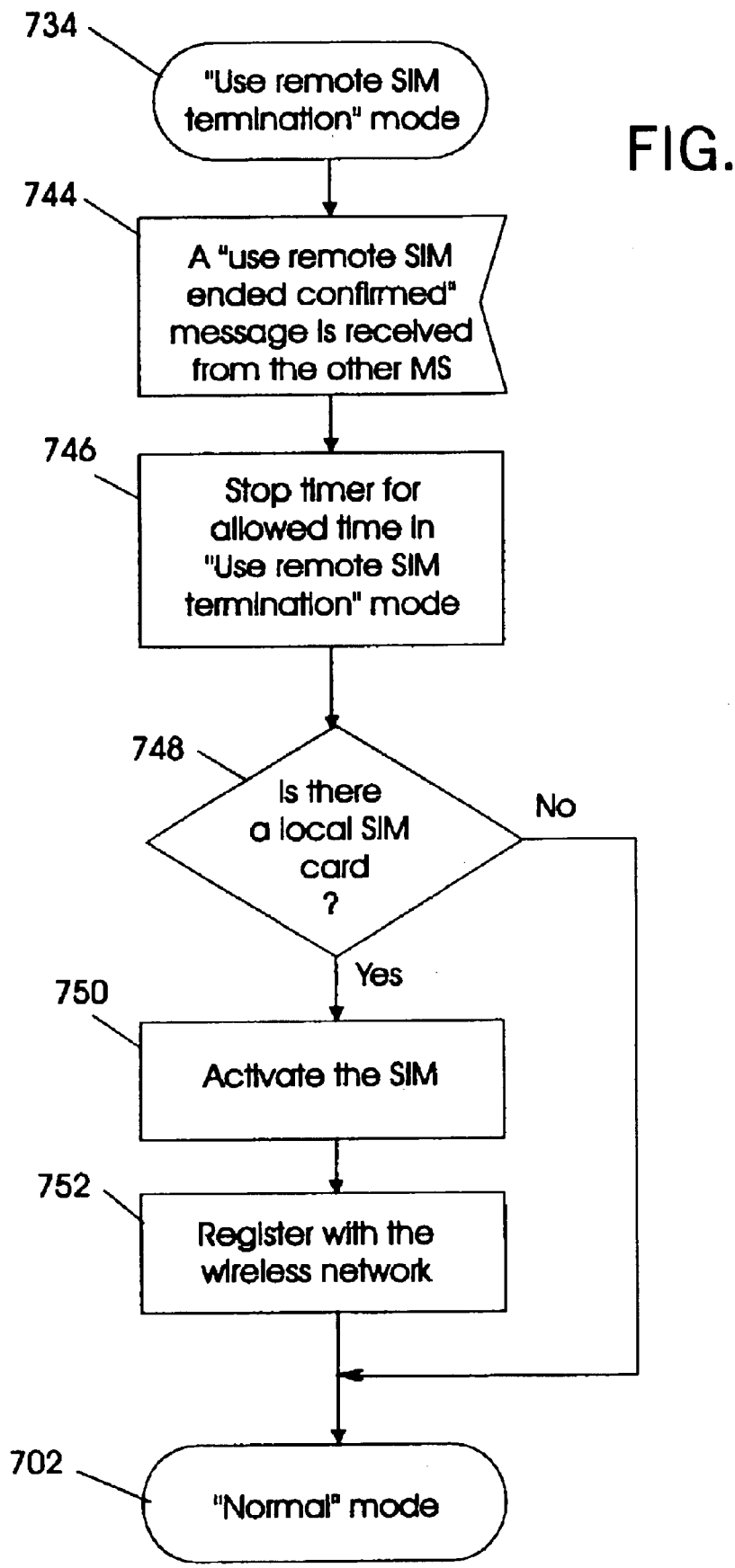

FIG. 7G begins with the using terminal in the "use remote SIM termination" mode, 734. A confirmation message is received from the other mobile station at 744. The pending timer is stopped at 746. A check is made at 748 to determine if there is a local SIM card that should be reactivated. If not, the using terminal returns to normal mode 702. If so, the local SIM is activated at 750 and the mobile station re-registers with the network at 752.

Figure 7H:
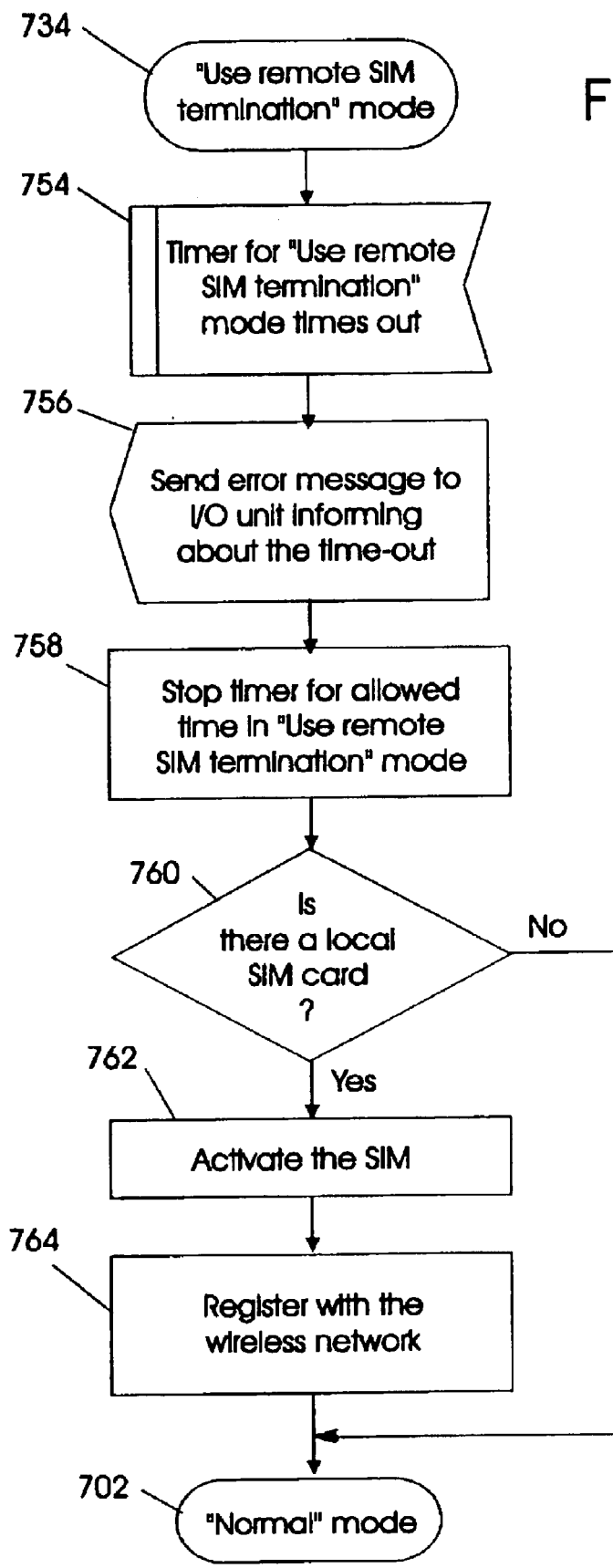

FIG. 7H illustrates how the state machine transitions from the "use remote SIM termination" mode, 734, to normal mode 702 when the pending timer times out. If the timer times out at 754, an appropriate error message is sent to the I/O section of the unit to inform the user of the condition at 756. The timer is reset at 758. Again, at 760, a check is made for a local SIM card. If it is not present, normal mode, 702, resumes. Otherwise, the SIM is activated at 762 and the terminal re-registers with the network at 764.

Figure 7I:
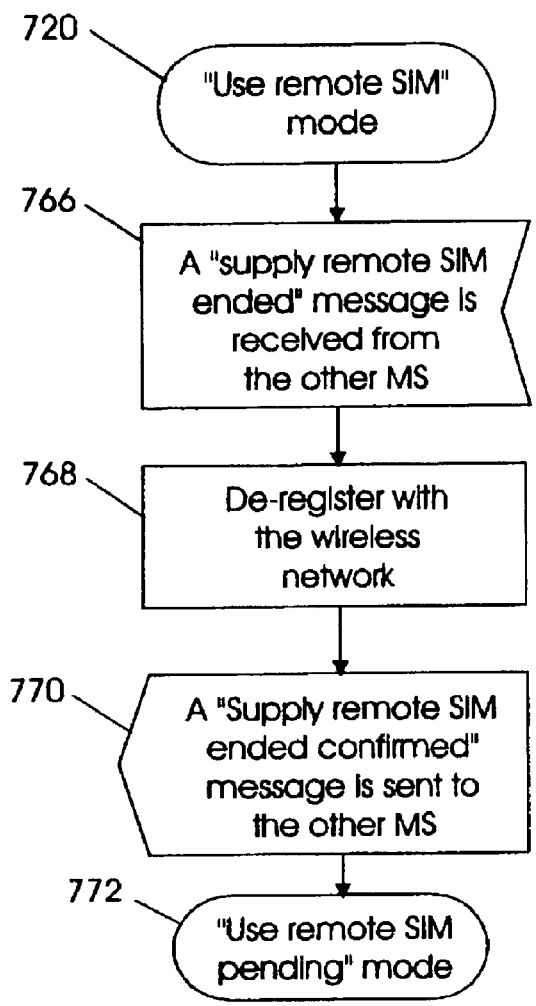

FIG. 7I illustrates what happens in a using terminal if "use remote SIM" mode, 720, is ended by receiving a message from the other mobile station. At 766 the message is received from the other MS. At 768 the using mobile station de-registers with the network so that it no longer uses the subscriber identity information from the remote SIM. At 770 a confirmation message is sent to the other mobile station. This puts the using terminal in the "use remote SIM pending" mode, 772.

Figure 7J:
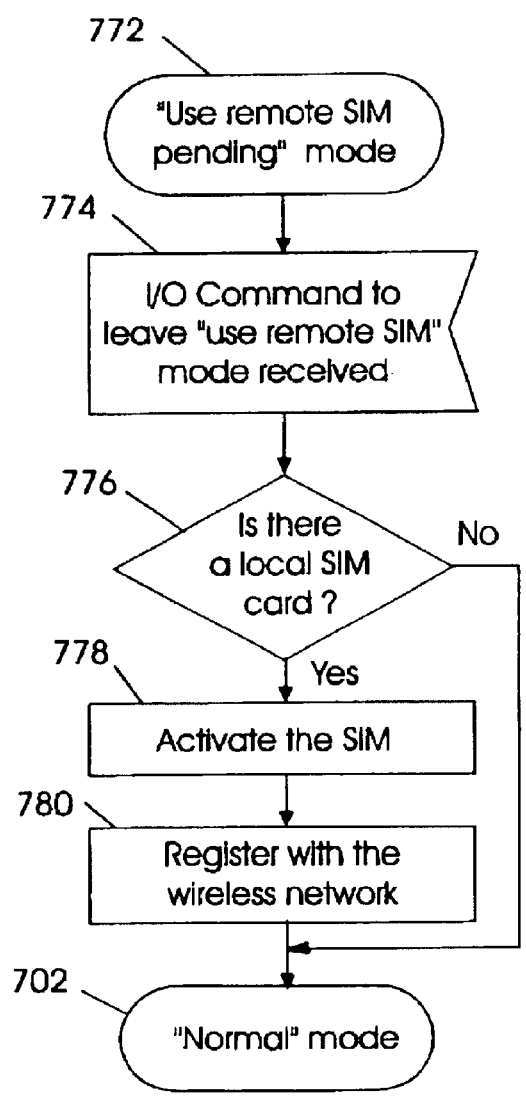

Finally, in FIG. 7J, the transition back to normal mode from the aforementioned "use remote SIM pending" mode, 772, is illustrated. The user confirms the ending of the "use remote SIM" mode at 774. At 776 a check is made for a local SIM card. If there is no local SIM card, the normal mode, 702, resumes. If a local SIM card is present, the SIM is activated at 778 and the unit re-registers with the network using its own local subscriber identity information from its own SIM at 780.

Much of the description herein has focussed on the context of mobile terminals or mobile stations. As previously mentioned, the invention can be implemented in other types of terminals and devices. Even within the context of mobile terminals, that term is synonymous with wireless terminals, wireless communication terminals, cellular telephones, personal communication system terminals, personal data assistance, as well as conventional laptop or palmtop computers or other appliances, which include wireless terminal functions. A wired communication terminal can also be used for some of the function described, whether or not the wired communication terminal uses a wireless protocol for the local communication interface. In the context of this disclosure, a desktop computer with access to a network is considered a communication terminal.

It should also be noted that elements of the invention may be embodied in hardware and/or software, including firmware or microcode. Depending on the type of communication terminal device, software which implements the invention may even take the form of a computer program product on a computer usable medium or storage medium. This may be the case, for example, if a personal computer is serving the function of a communication terminal according to the invention. In the context of this document, a computer usable or computer readable medium may be any medium that can contain, store, communicate, propagate, or transport the program for use by or in connection with the apparatus or device. This medium may be electronic, magnetic, optical, or a propagation medium. The medium could even be paper or another suitable medium upon which the program is printed, as the program can be electronically captured, via, for instance, optical scanning of the paper or other medium.

Specific embodiments of an invention are described herein. One of ordinary skill in the telecommunication arts will quickly recognize that the invention has other applications in other environments. In fact, many embodiments and implementations are possible. The appended claims are not intended to limit the scope of the invention to the specific embodiments described above. In addition, the recitation "means for" is intended to evoke a means-plus-function reading of an element in a claim, whereas, any elements that do not specifically use that recitation are not intended to be read as means-plus-function elements, even if they otherwise include the word "means."

What is claimed is:

1. In a communication terminal, a method of accessing a network using remote subscriber identity information, the method comprising:

receiving an command to use the remote subscriber identify information;

establishing a local communication link with an independent device containing the remote subscriber identify information;

receiving the remote subscriber identify information from the independent device over the local communication link;

de-registering with the network with local subscriber information; and registering with the network using the remote subscriber identify information after de-registering with the network with the local subscriber information.

2. The method of claim 1 further comprising, prior to registering with the network using the remote subscriber identify information:

requesting authentication information from the user; and receiving authentication information from the user.

3. The method of claim 1 further comprising, subsequent to registering with the network using the remote subscriber identity information:

receiving a subsequent command to cease using the remote subscriber identity information;

de-registering with the network with the remote subscriber identity information; and re-registering with the network using the local subscriber identify information.

4. The method of claim 3 further comprising, prior to registering with the network using the remote subscriber identify information:

requesting authentication information from the user; and receiving authentication information from the user.

5. A communication terminal operable to access a network using remote subscriber identity information, the communications terminal comprising:

means for receiving an command to use the remote subscriber identify information;

means for establishing a local communication link with an independent device containing the remote subscriber identify information;

means for receiving the remote subscriber identify information from the independent device over the local communication link;

means for de-registering with the network with local subscriber information; and means for registering with the network using the remote subscriber identify information after de-registering with the network with the local subscriber information.

6. The communication terminal of claim 5 further comprising:

means for requesting authentication information from the user prior to registering with the network using the remote subscriber identify information; and means for receiving the authentication information from the user.

7. The communication terminal of claim 5 further comprising:

means for receiving a command subsequent to registering with the network using the remote subscriber identity information to cease using the remote subscriber identity information;

means for de-registering with the network with the remote subscriber identity information; and means for re-registering with the network using the local subscriber identify information.

8. The communication terminal of claim 7 further comprising:

means for requesting authentication information from the user prior to registering with the network using the remote subscriber identify information; and means for receiving the authentication information from the user.

* * * * *